US011864686B2

(12) United States Patent
Saito

(10) Patent No.: US 11,864,686 B2
(45) Date of Patent: Jan. 9, 2024

(54) COFFEE MACHINE

(71) Applicant: DAITO GIKEN, INC., Tokyo (JP)

(72) Inventor: Toshio Saito, Tokyo (JP)

(73) Assignee: DAITO GIKEN, INC., Tokyo (JP)

(*) Notice: Subject to any disclaimer, the term of this patent is extended or adjusted under 35 U.S.C. 154(b) by 0 days.

(21) Appl. No.: 18/025,964

(22) PCT Filed: Dec. 1, 2022

(86) PCT No.: PCT/JP2022/044347
§ 371 (c)(1),
(2) Date: Mar. 13, 2023

(87) PCT Pub. No.: WO2023/100972
PCT Pub. Date: Jun. 8, 2023

(65) Prior Publication Data
US 2023/0292951 A1 Sep. 21, 2023

(30) Foreign Application Priority Data

Dec. 3, 2021 (JP) ................. 2021-197320

(51) Int. Cl.
A47J 31/42 (2006.01)
A47J 42/46 (2006.01)
A47J 42/52 (2006.01)

(52) U.S. Cl.
CPC .............. *A47J 31/42* (2013.01); *A47J 42/46* (2013.01); *A47J 42/52* (2013.01)

(58) Field of Classification Search
CPC .. A47J 31/42; A47J 42/46; A47J 42/50; A47J 42/52
See application file for complete search history.

(56) References Cited

U.S. PATENT DOCUMENTS

2010/0170971 A1  7/2010  Doglioni Majer
2012/0017765 A1* 1/2012  Leung ............ A47J 31/42
                                                    99/286

(Continued)

FOREIGN PATENT DOCUMENTS

CA    2934297 A1 *  1/2017  .............. A47J 31/42
JP    2010-527677 A    8/2010

(Continued)

OTHER PUBLICATIONS

Jan. 10, 2023 International Search Report issued in International Patent Application No. PCT/JP2022/044347.

(Continued)

*Primary Examiner* — Reginald Alexander
(74) *Attorney, Agent, or Firm* — Oliff PLC

(57) ABSTRACT

A coffee machine equipped with a grinder that grinds coffee beans, and a blade that grinds the coffee beans can be replaced with a blade having a different pattern. A main body includes a drive source, first power transmission portions, and a gear portion (gear of a manual setting disc dial), a grinder unit is fitted into the main body, the grinder unit includes a second power transmission portion, and interlocking portions, and is detachable from the main body, and when the grinder unit is fitted into the main body, the second power transmission portion and the like are coupled to the first power transmission portions, and the interlocking portions are coupled to the gear portion (gear of the manual setting disc dial).

5 Claims, 12 Drawing Sheets

(56) References Cited

U.S. PATENT DOCUMENTS

2021/0307558 A1* 10/2021 Lee .................. A47J 31/42
2022/0071438 A1* 3/2022 Harbers ............. A47J 42/18

FOREIGN PATENT DOCUMENTS

| JP | 2019-030433 A | 2/2019 | | |
|---|---|---|---|---|
| JP | 2020-116270 A | 8/2020 | | |
| WO | WO-2018084395 A1 * | 5/2018 | ............ | A47J 31/401 |
| WO | WO-2019230314 A1 * | 12/2019 | ............ | A47J 31/42 |

OTHER PUBLICATIONS

Oct. 3, 2022 Decision to Grant a Patent issued in Japanese Patent Application No. 2022-114435.

\* cited by examiner

[Figure 1]
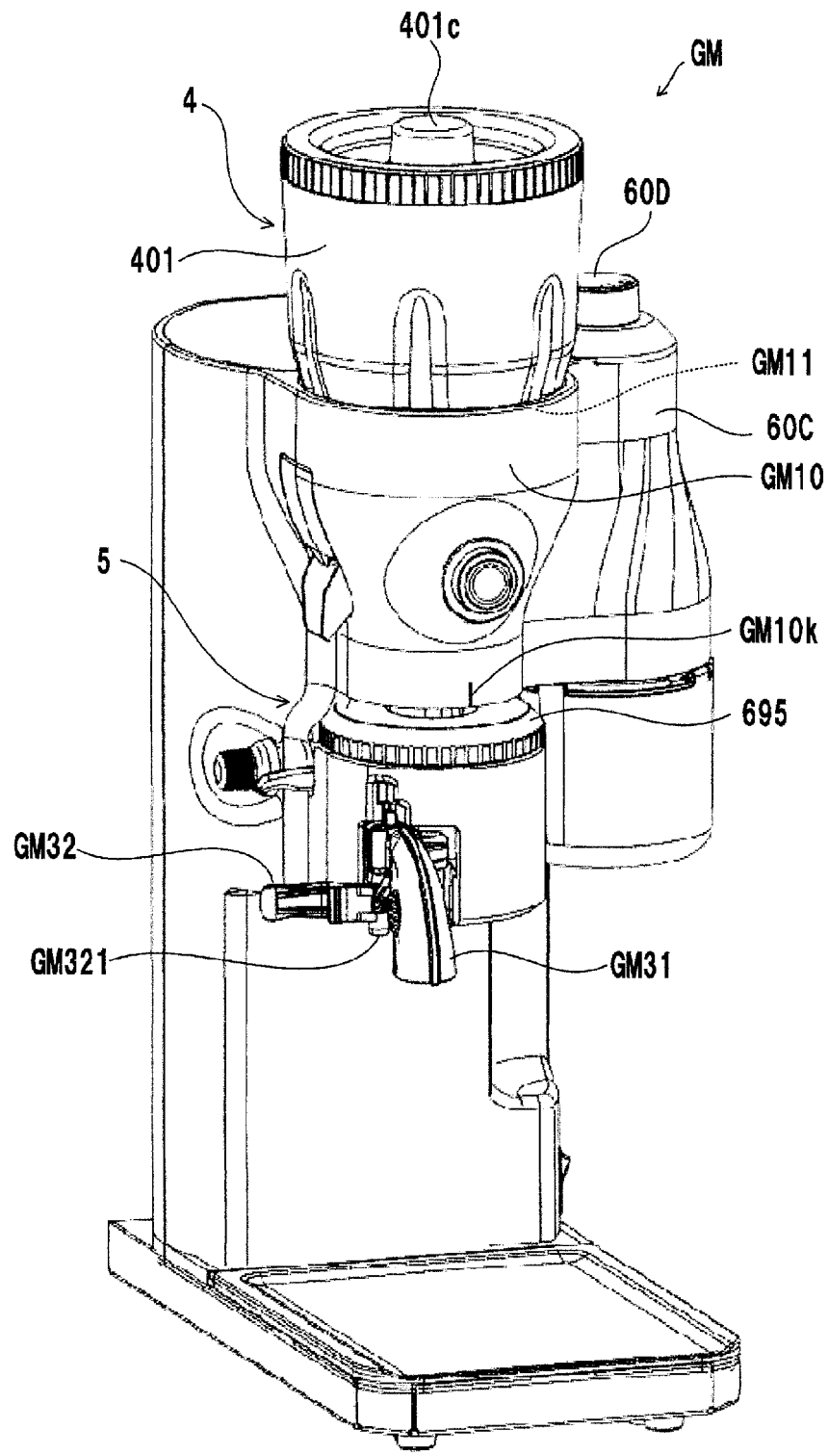

[Figure 2]
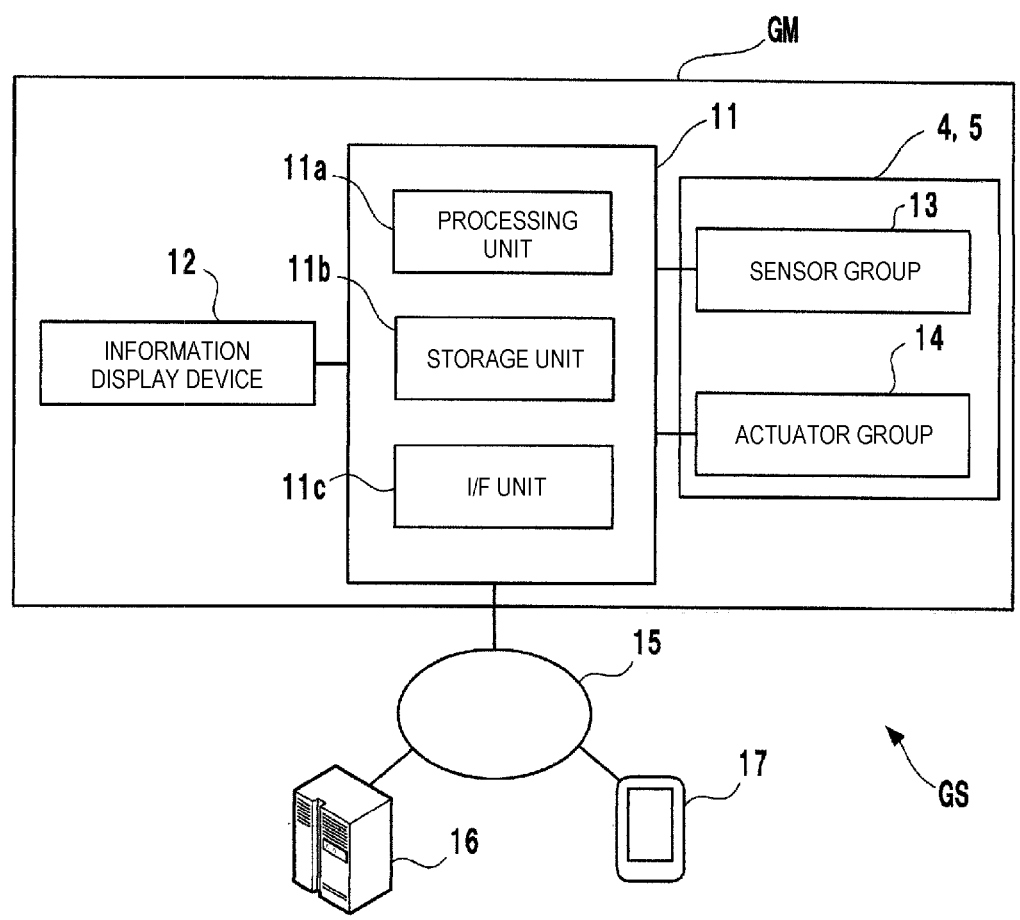

[Figure 3]
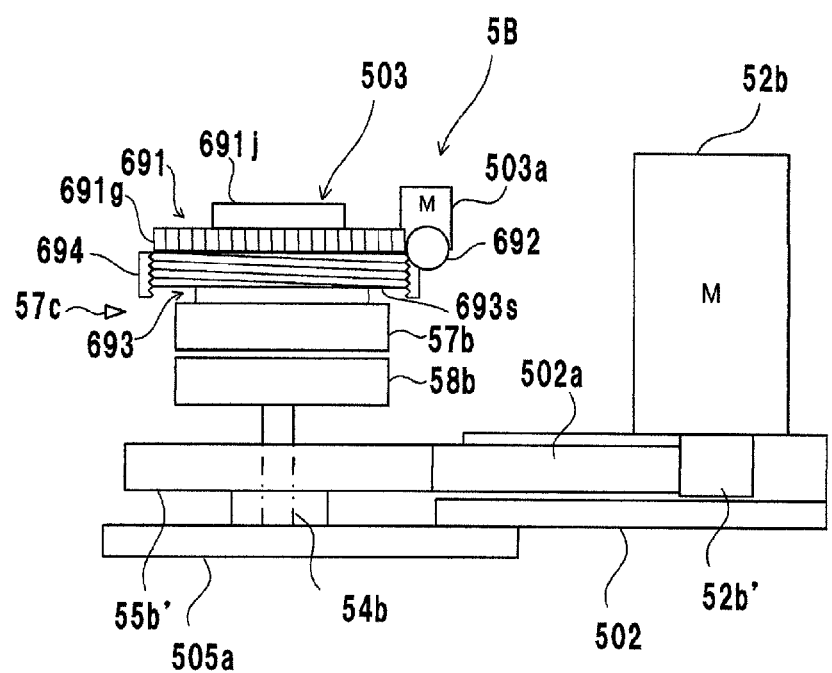

[Figure 4]
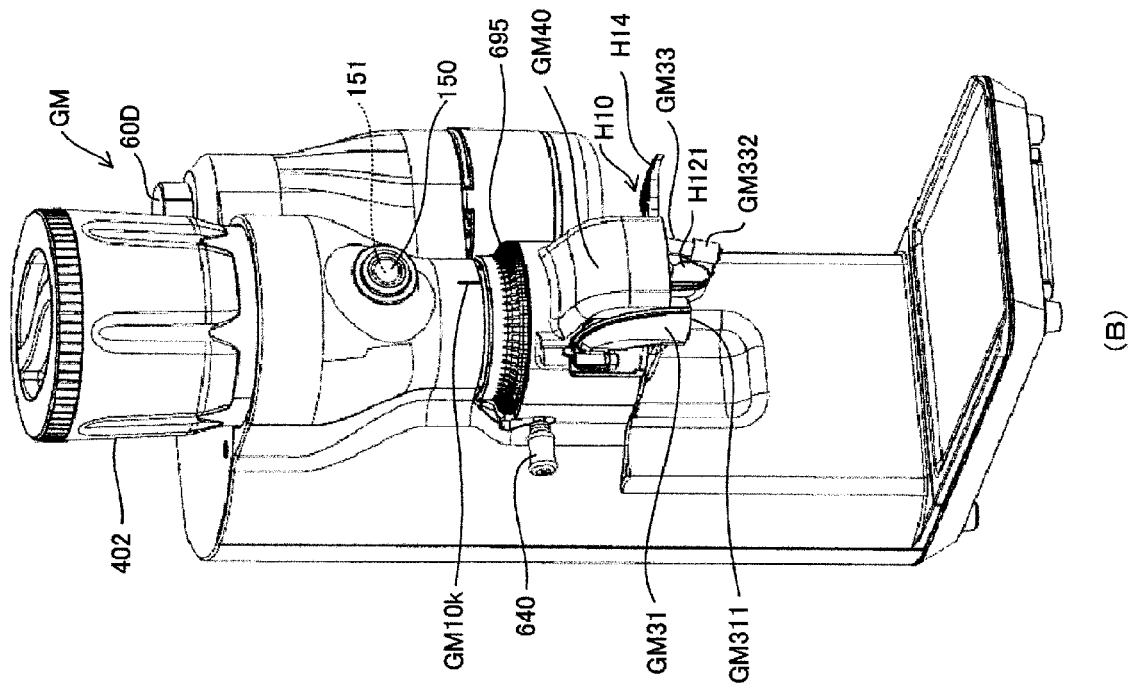
(B)
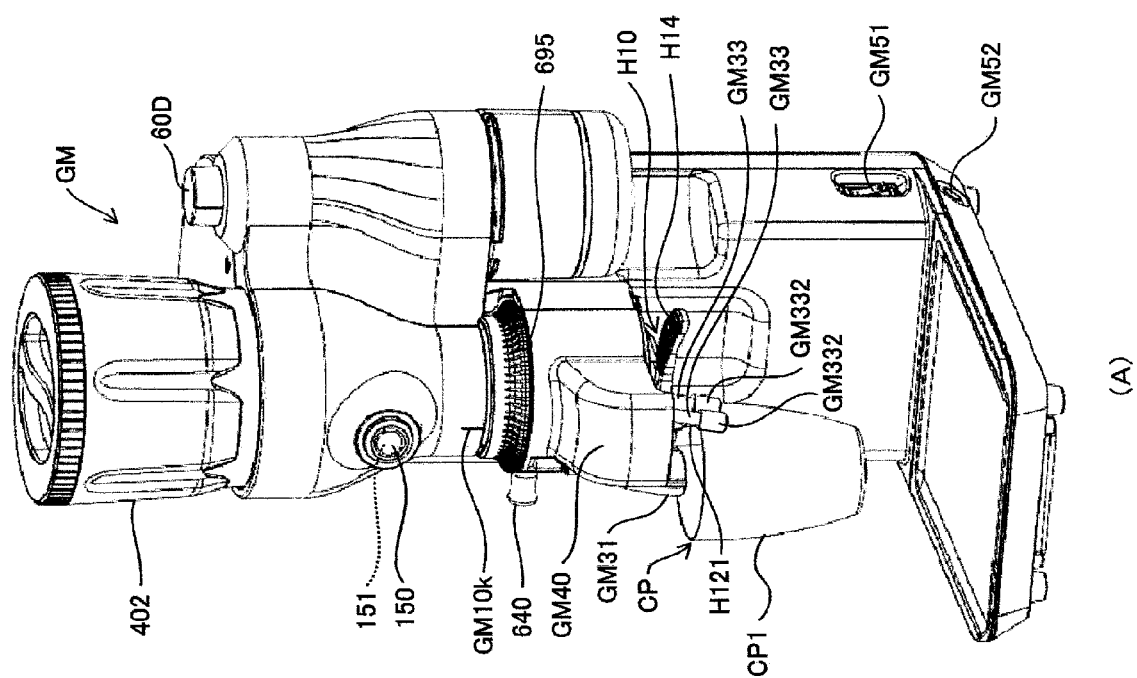
(A)

[Figure 5]
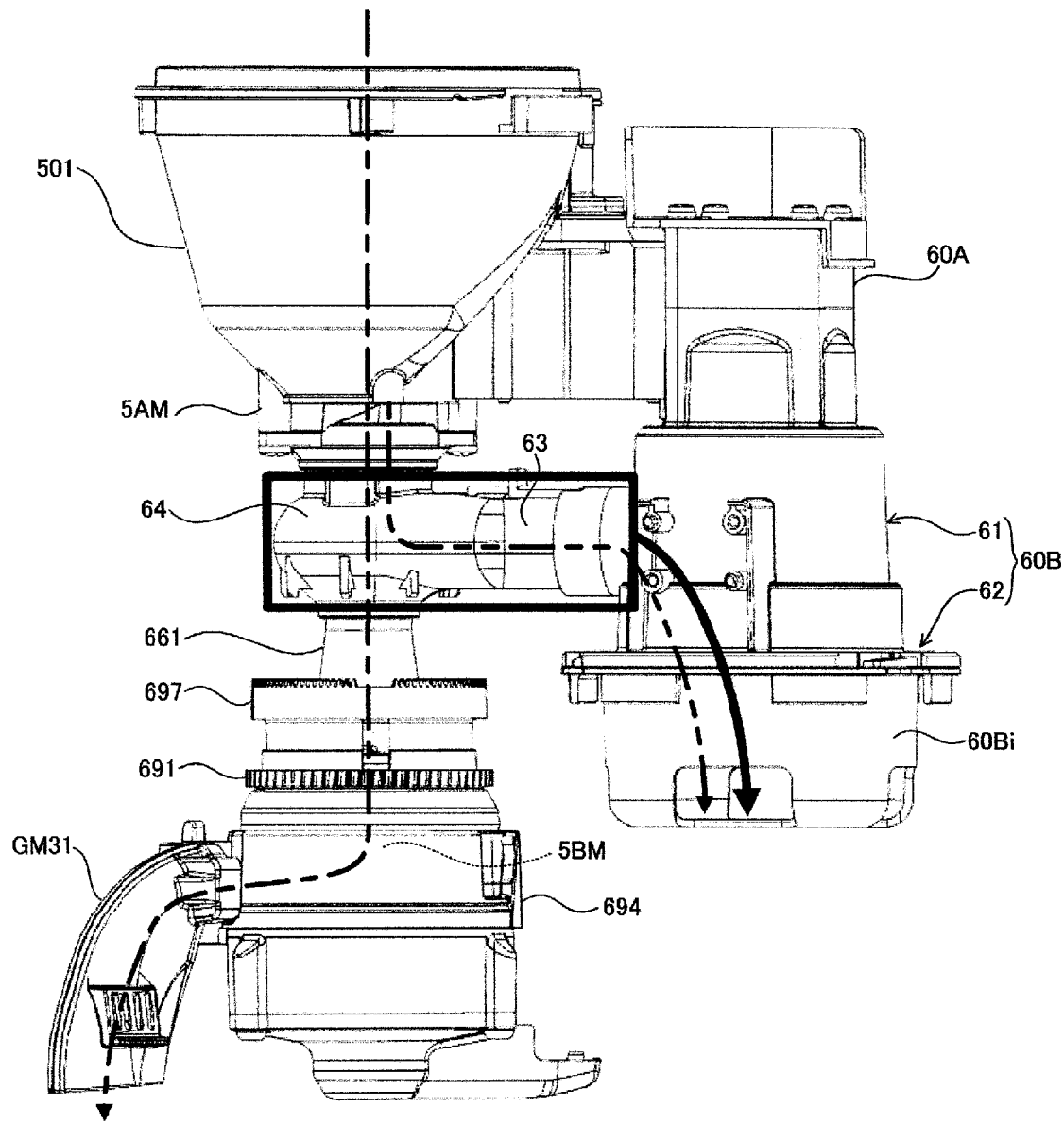

[Figure 6]
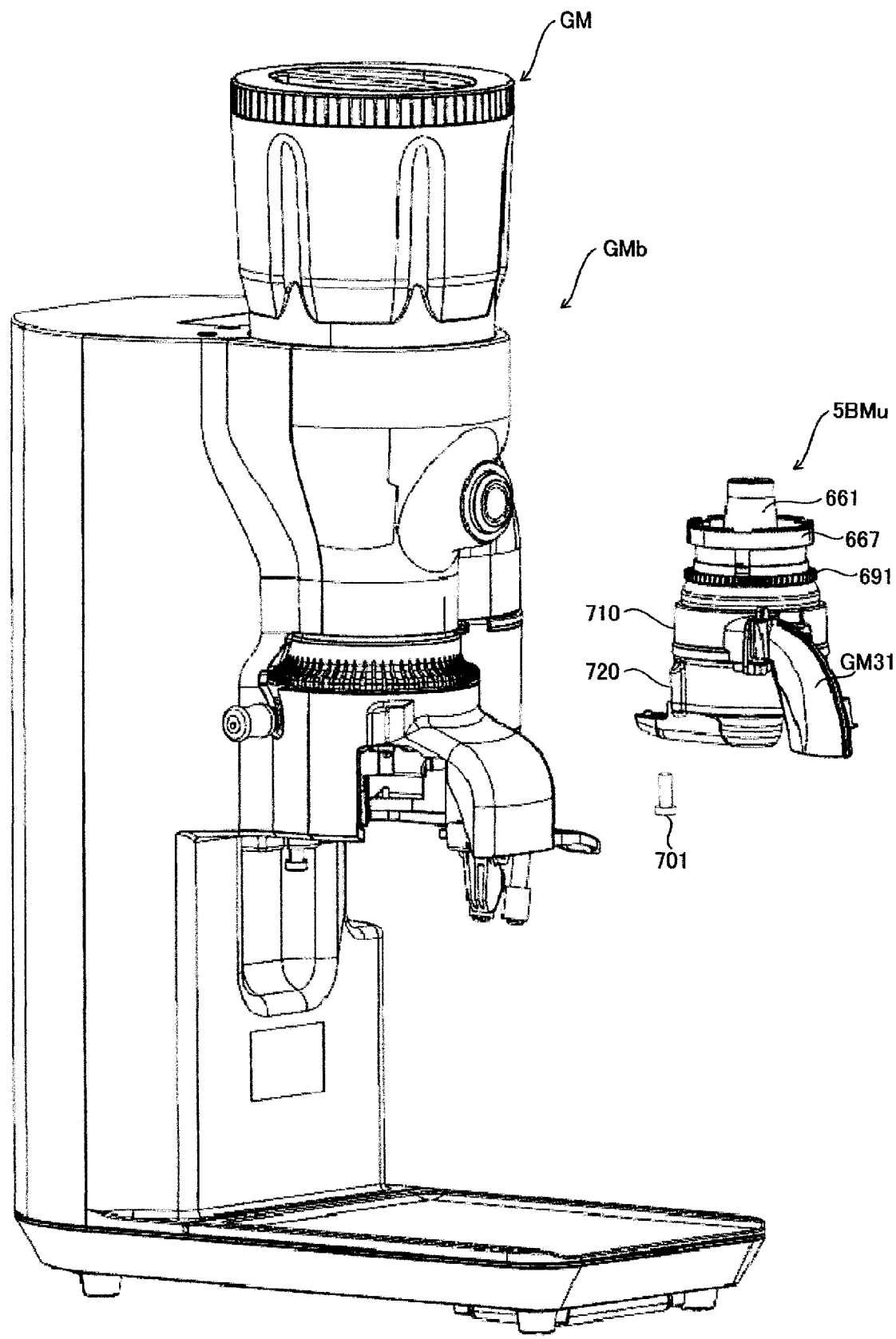

[Figure 7]
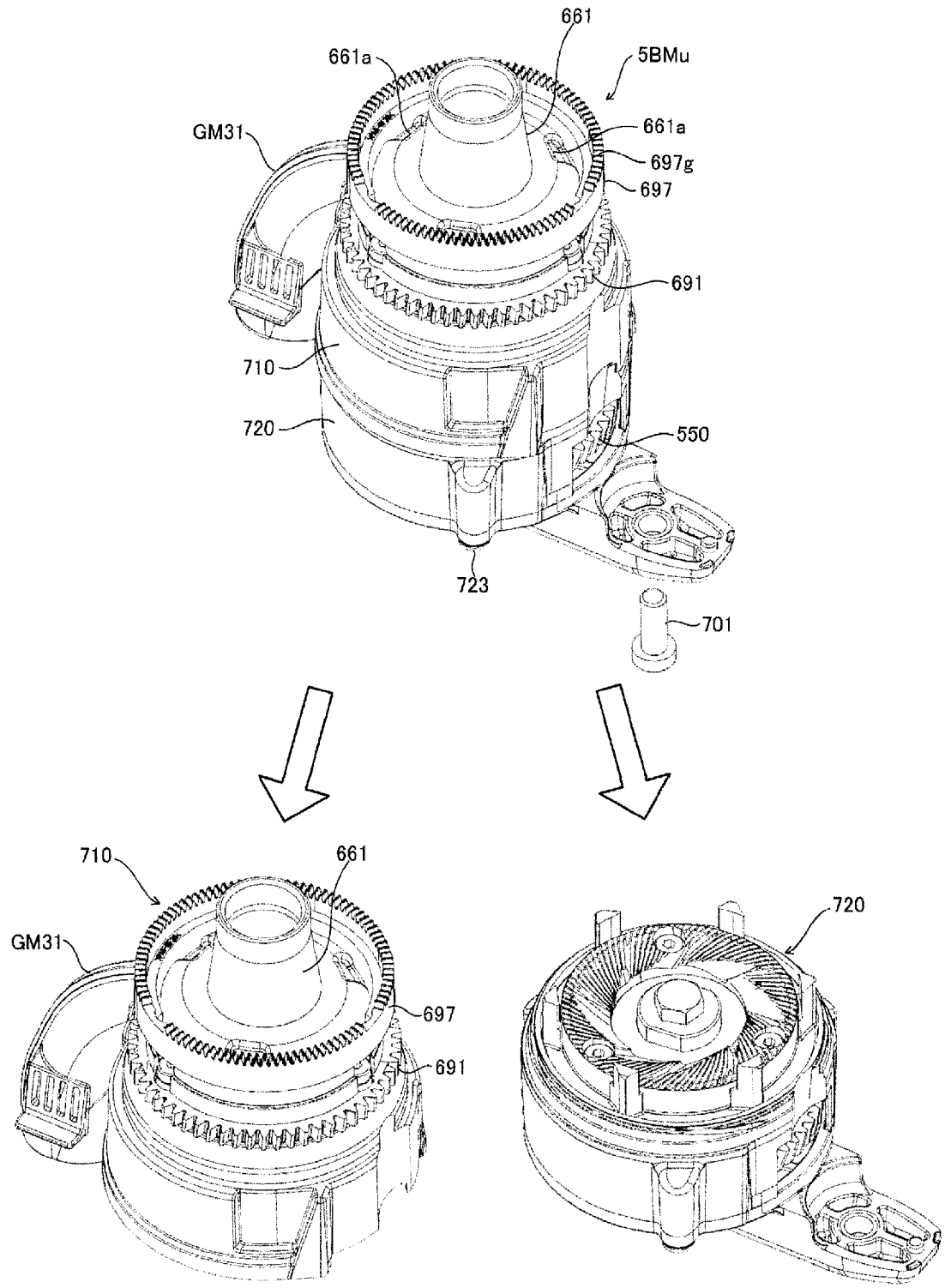

[Figure 8]
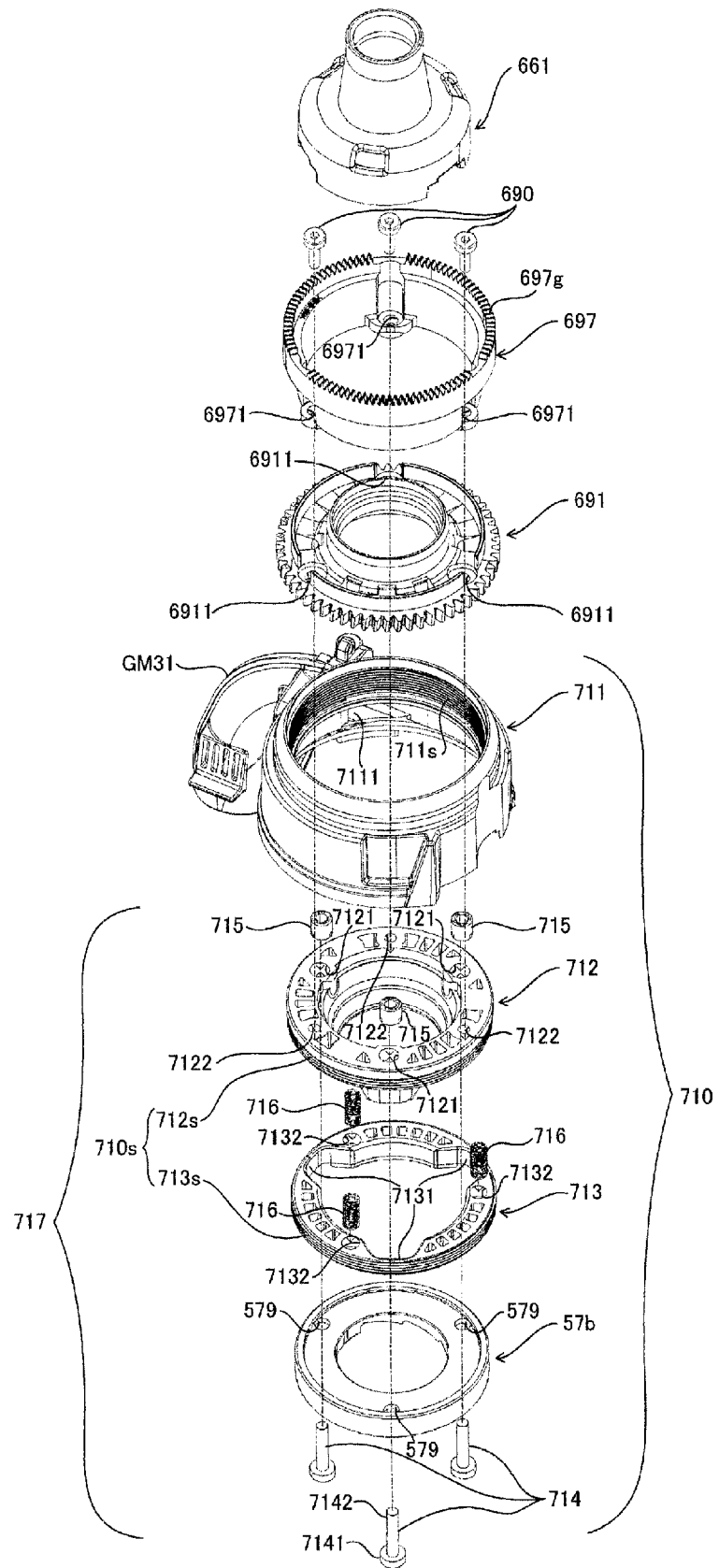

[Figure 9]
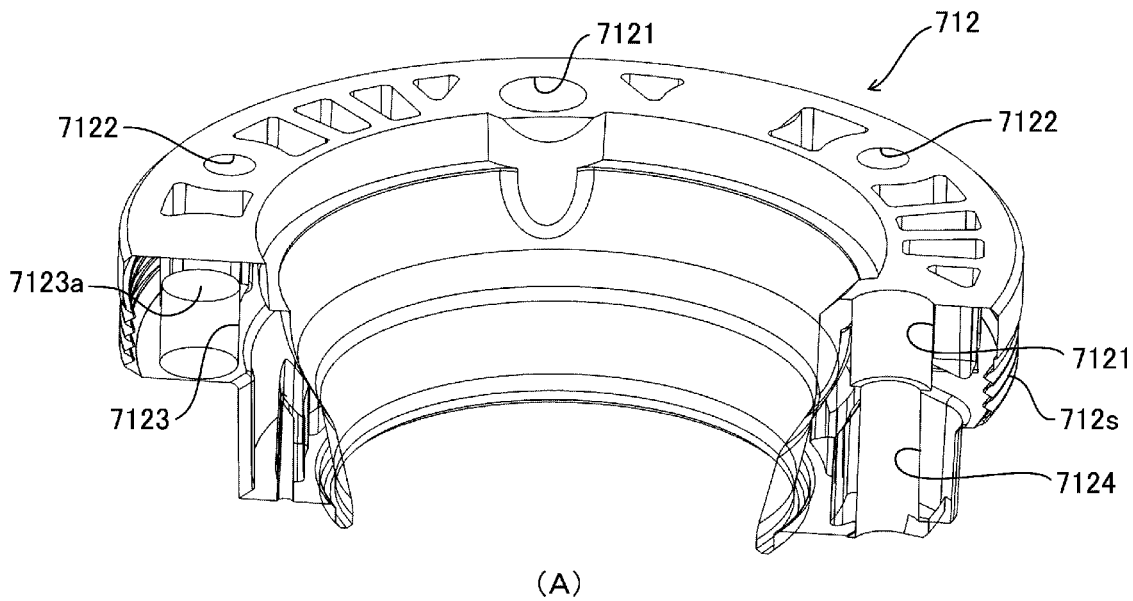
(A)
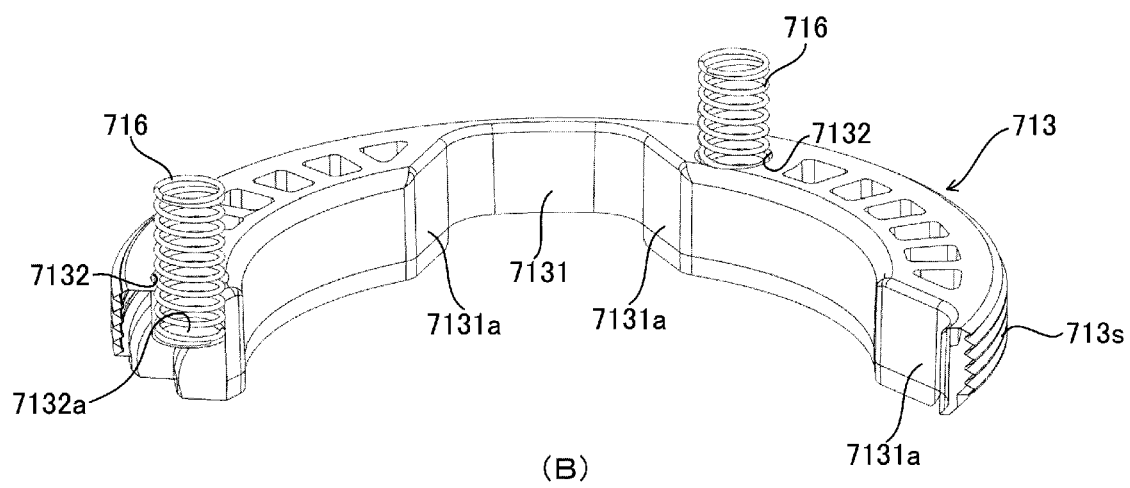
(B)

[Figure 10]
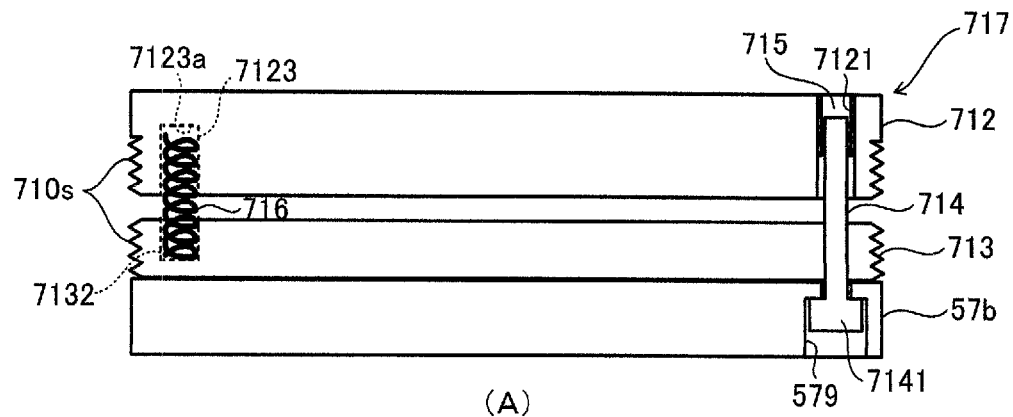
(A)
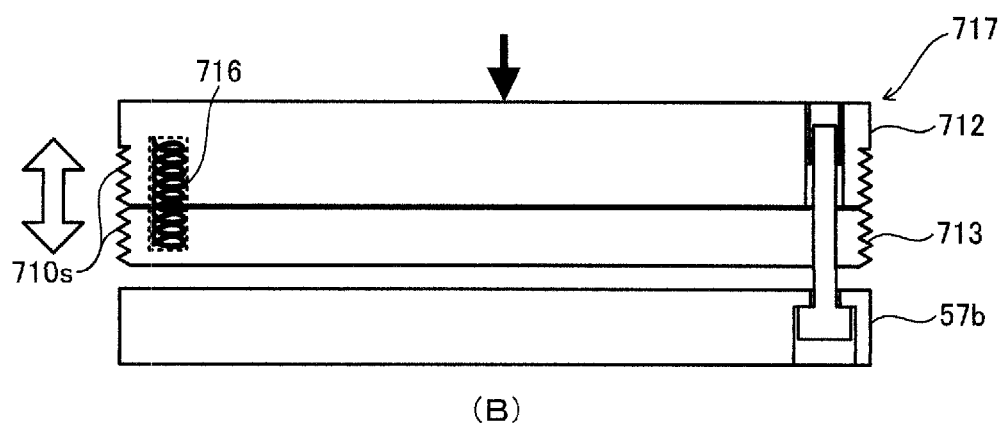
(B)
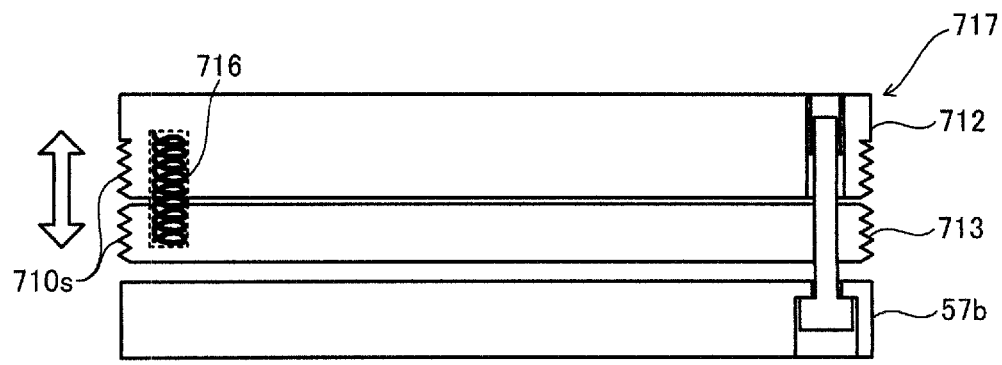
(C)

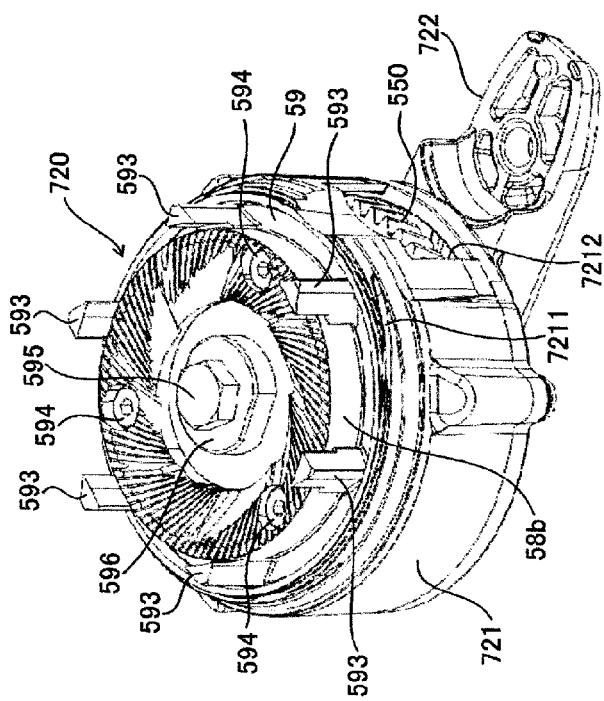
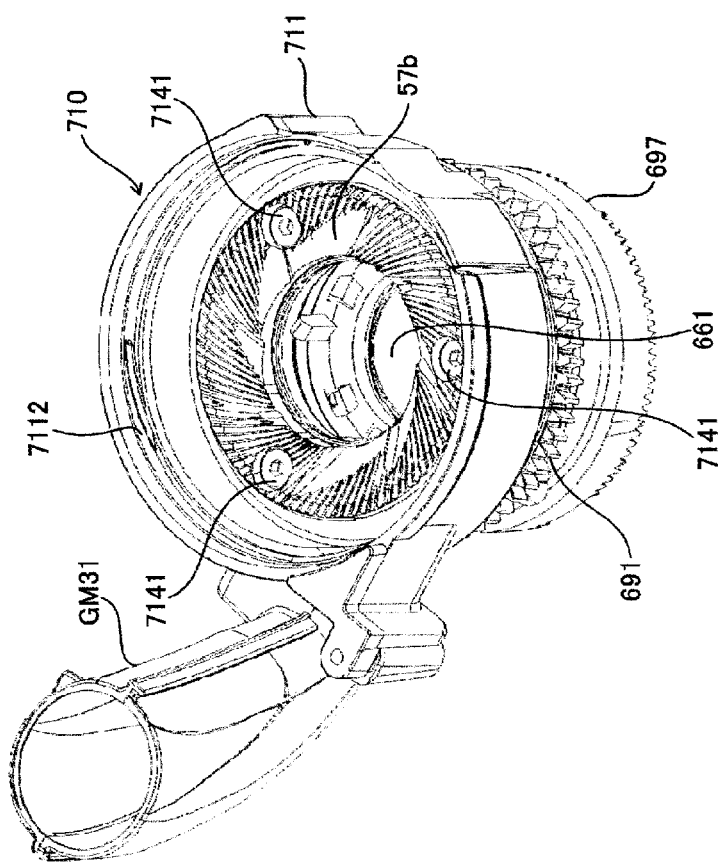
[Figure 11]

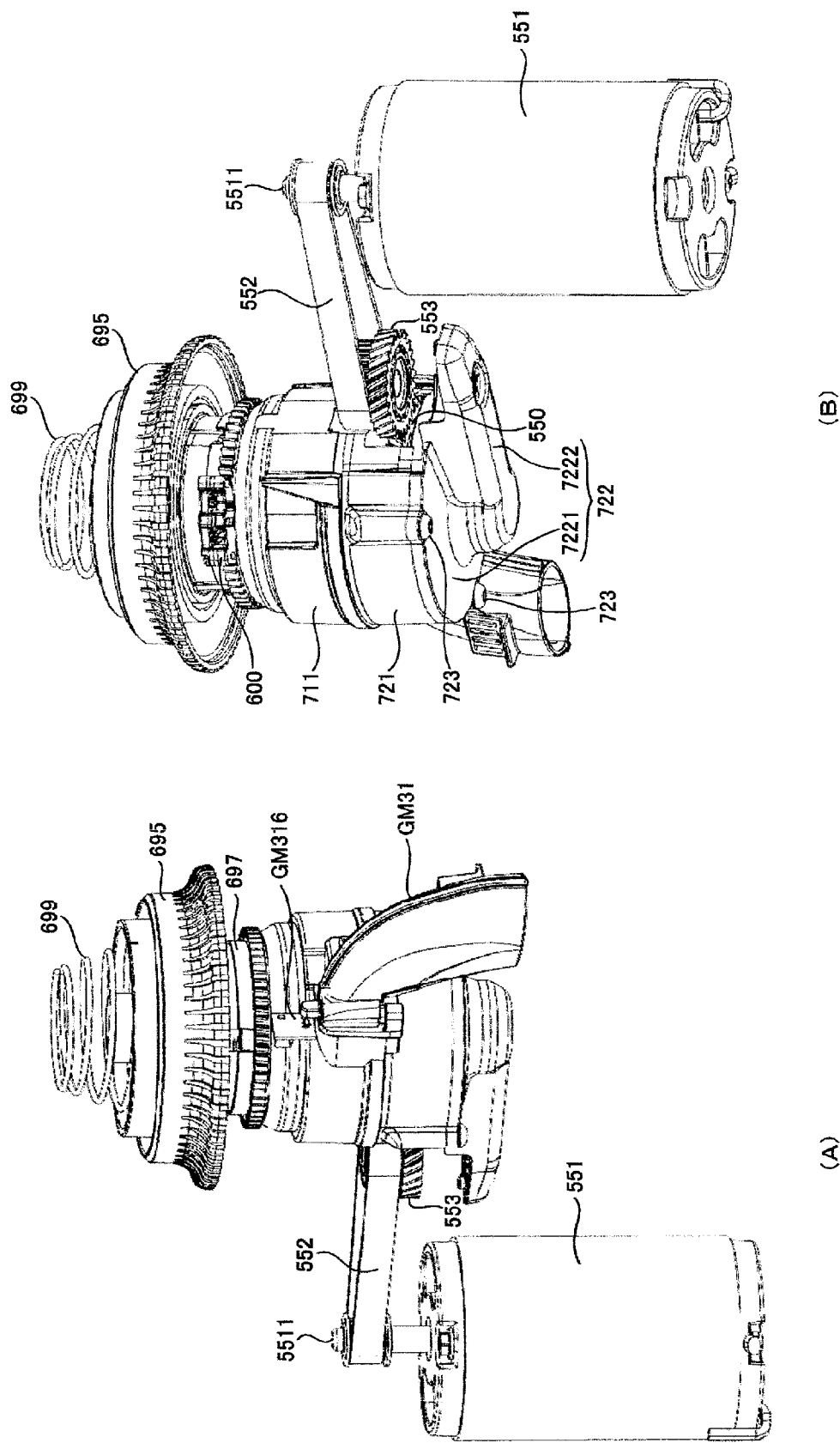
[Figure 12]

COFFEE MACHINE

TECHNICAL FIELD

The present invention relates to a coffee machine including a grinder that grinds coffee beans.

BACKGROUND ART

A coffee machine that performs adjustment using coffee beans has been proposed (for example, Patent Literature 1). The coffee machine proposed in Patent Literature 1 is equipped with a coffee bean grinding mechanism (grinder) and a coffee beverage extraction mechanism. Coffee machines equipped with only a grinder are known.

In general, it is known that when a particle size of ground beans is changed, even if the same roasted coffee beans are used, a taste of an extracted coffee beverage will differ.

CITATION LIST

Patent Literature

Patent Literature 1: Japanese Patent Laid-Open No. 2019-30433

SUMMARY OF INVENTION

Technical Problem

As a result of intensive studies, the present inventors have found that the taste of the extracted coffee beverage varies depending on a pattern of a blade that grinds the coffee beans.

Therefore, if the blade that grinds the coffee beans can be easily replaced with a blade having a different pattern in one coffee machine, coffee beverages of various tastes can be enjoyed even with the same coffee beans. On the other hand, although the blade can be easily replaced, an increase in cost for the replacement leads to a reduction in cost merit as compared with a case in which two coffee machines equipped with blades having different patterns are prepared.

In view of the above circumstances, an object of the present invention is to provide a coffee machine capable of easily and inexpensively replacing a blade that grinds coffee beans with a blade having a different pattern.

Solution to Problem

In order to achieve the above object, a coffee machine according to the present invention includes:
 a main body;
 a grinder unit configured to grind coffee beans between a first blade and a second blade;
 a rotation drive mechanism configured to rotationally drive the second blade; and
 an interval adjustment mechanism configured to adjust an interval between the first blade and the second blade, in which
 the rotation drive mechanism includes a drive source configured to rotationally drive the second blade, a first power transmission portion configured to transmit power of the drive source, and a second power transmission portion configured to transmit the power transmitted from the first power transmission portion to the second blade,
 the interval adjustment mechanism includes a gear portion and an interlocking portion that is interlocked with the gear portion,
 the main body includes the drive source, the first power transmission portion, and the gear portion, and the grinder unit is fitted into the main body,
 the grinder unit includes the second power transmission portion and the interlocking portion, and is detachable from the main body, and
 when the grinder unit is fitted into the main body, the second power transmission portion is coupled to the first power transmission portion, and the interlocking portion is coupled to the gear portion.

The coffee machine may be a coffee machine, in which when the grinder unit [for example, a main mill unit 5BMu] is released from the main body [for example, a main body GMb], the coupling between the second power transmission portion and the first power transmission portion is released, and the coupling between the interlocking portion and the gear portion is also released.

The coffee machine may be a coffee machine, in which the grinder unit includes an outlet [for example, an outlet GM311 of a chute GM31] through which the ground beans ground between the first blade and the second blade flow down to an outside, and is fitted into the main body from below, and
 the outlet is positioned below a coupling position between the second power transmission portion and the first power transmission portion and below a coupling position between the interlocking portion and the gear portion [for example, FIG. 5].

The coffee machine may be a coffee machine, in which the main body includes a frame member, and the grinder unit includes a case body [for example, a rotary blade case body 721] defining an outer shape, and is attached to the main body by a fitting structure between the case body and the frame member.

The coffee machine may be a coffee machine, in which the main body is provided with an attachment hole, the grinder unit includes an arm portion [for example, an arm portion 7222] extending in one direction below the case body, and when the case body is fitted into the frame member, a tip end portion of the arm portion coincides with the attachment hole, and the arm portion is fixed to the main body by a fixing screw [for example, a fixing screw 701] inserted into the attachment hole from the tip end portion.

Advantageous Effects of Invention

According to a coffee machine of the present invention, a blade that grinds coffee beans can be easily and inexpensively replaced with a blade having a different pattern.

BRIEF DESCRIPTION OF DRAWINGS

FIG. 1 is an external perspective view of a coffee bean grinding machine.

FIG. 2 is a block diagram of a control device of the coffee bean grinding machine.

FIG. 3 is a view schematically showing a configuration of a second grinder 5B.

FIG. 4 shows perspective views of a coffee bean grinding machine according to a second embodiment.

FIG. 5 is a diagram showing a path for coffee beans, a path for waste such as chaff, and a path for after-cleaning.

FIG. 6 is a perspective view showing a state in which a main mill unit 5BMu is removed from a main body GMb of a coffee bean grinding machine GM.

FIG. 7 shows diagrams illustrating a configuration of the main mill unit 5BMu.

FIG. 8 is an exploded perspective view showing a state in which a rotary blade unit 720 is removed from the main mill unit 5BMu shown in a lower left portion in FIG. 7.

FIG. 9 (A) is a cross-sectional perspective view of a base member 712, and (B) is a cross-sectional perspective view of an intermediate member 713.

FIG. 10 shows cross-sectional views schematically showing a fixed blade coupled body 717 and illustrates an action of a compression coil spring 716.

FIG. 11 (A) is a view in which the state in which the rotary blade unit 720 is removed from the main mill unit 5BMu shown in the lower left portion of FIG. 7 is inverted upside down, and (B) is a perspective view of the rotary blade unit 720 removed from the main mill unit 5BMu.

FIG. 12 FIG. 12 shows perspective views showing the main mill unit 5BMu, a main mill motor, a transmission mechanism that transmits a driving force of the main mill motor, a manual setting disc dial 695, a spring 699, a sensor substrate GM316, and a mechanical switch unit 600 extracted from the coffee bean grinding machine GM in which the main mill unit 5BMu is mounted on the main body GMb shown in FIG. 6.

FIG. 1 is the external perspective view of the coffee bean grinding machine, and FIG. 2 is the block diagram of the control device of the coffee bean grinding machine.

DESCRIPTION OF EMBODIMENTS

An embodiment according to the present invention will be described with reference to the drawings.

FIG. 1 is an external perspective view of a coffee bean grinding machine, and FIG. 2 is a block diagram of a control device of the coffee bean grinding machine.

A coffee bean grinding machine GM shown in FIG. 1 includes a reservoir device 4, a pulverizing device 5, and a control device 11 shown in FIG. 2 which controls the reservoir device 4 and the pulverizing device 5. The coffee bean grinding machine GM also includes an information display device 12 (see FIG. 2) wirelessly connected to the control device 11. The information display device 12 is a touch panel type display for inputting various control instructions, set values, and the like of the coffee bean grinding machine GM, and can receive input from an administrator or a user in addition to displaying various kinds of information. The information display device 12 is provided with a speaker and a camera.

The control device 11 controls the entire coffee bean grinding machine GM. The control device 11 includes a processing unit 11a, a storage unit 11b, and an interface (I/F) unit 11c. The processing unit 11a is, for example, a processor such as a CPU. The storage unit 11b is, for example, a RAM or a ROM. A recipe is stored in the storage unit 11b. The recipe includes information on various conditions for grinding coffee beans, beans information, recipe creator information, comments of a recipe creator, and the like. The I/F unit 11c includes an input and output interface that inputs and outputs a signal between an external device and the processing unit 11a. The I/F unit 11c also includes a communication interface capable of performing data communication with an external terminal such as a server 16 or a mobile terminal 17 via a communication network 15 such as the Internet. The server 16 can communicate with the mobile terminal 17 such as a smartphone via the communication network 15, and can receive, for example, information such as a reservation for production of ground beans of coffee and an impression from the mobile terminal 17 of a consumer. A coffee bean grinding system GS that grinds the coffee beans includes the coffee bean grinding machine GM, the server 16, and the mobile terminal 17.

The processing unit 11a executes a program stored in the storage unit 11b, and controls the reservoir device 4 and the pulverizing device 5 according to the recipe. More specifically, the processing unit 11a controls an actuator group 14 in accordance with the recipe, and controls the actuator group 14 based on an instruction from the information display device 12, a detection result of a sensor group 13, or an instruction from the server 16. The sensor group 13 includes various sensors (for example, an operation position detection sensor of a mechanism) provided in the reservoir device 4 and the pulverizing device 5. The actuator group 14 includes various actuators (for example, a motor) provided in the reservoir device 4 and the pulverizing device 5.

The reservoir device 4 shown in FIG. 1 includes a cylindrical canister accommodation unit 401 and a detachable cap 401c that is screwed to an upper end portion of the canister accommodation unit 401 and covers an upper surface of the canister accommodation unit 401. A canister accommodation chamber (not shown) is provided inside the canister accommodation unit 401. A plurality of canister accommodation chambers are provided in a circumferential direction, and a plurality of canisters can be accommodated inside the canister accommodation unit 401. The plurality of canisters accommodated in the reservoir device 4 can be selectively used. Therefore, it is possible to perform a grinding process by selecting roasted coffee beans of different varieties or roasted coffee beans having different degrees of roasting, and it is also possible to perform a grinding process by mixing a plurality of types of roasted coffee beans of different varieties or degrees of roasting.

The canister accommodation unit 401 is detachably attached to an option attachment portion GM11 provided in an upper portion of a center casing GM10 of the coffee bean grinding machine GM. In addition to the canister accommodation unit 401, a plurality of types of units can be attached to the option attachment portion GM11. The upper portion of the center casing GM10 covers a lower portion of a unit attached to the option attachment portion GM11. A type of the unit attached to the option attachment portion GM11 may be displayed on the external terminal such as the mobile terminal 17 capable of communicating with the coffee bean grinding machine GM.

The pulverizing device 5 includes a first grinder 5A, a second grinder 5B, and a separation device 6. The first grinder 5A and the second grinder 5B are mechanisms that grind the roasted coffee beans. The roasted coffee beans are ground by the first grinder 5A, and then further ground by the second grinder 5B into powder. That is, the first grinder 5A and the second grinder 5B are different in a ground particle size of beans. The first grinder 5A is a grinder for coarse grinding, and the second grinder 5B is a grinder for fine grinding. The first grinder 5A and the second grinder 5B are electric grinders, and include a motor as a drive source, a rotary blade driven by the motor, and the like. A size (particle size) of the roasted coffee beans to be pulverized can be changed by changing the number of rotations of the rotary blade. The separation device 6 is a mechanism that separates waste such as chaff and fine powder from the ground beans.

The ground beans ground by the second grinder 5B are discharged from a chute GM31 shown in FIG. 1.

The chute GM31 shown in FIG. 1 guides the ground beans fed in a substantially horizontal direction downward. The coffee bean grinding machine GM shown in FIG. 1 is provided with a hammer member GM32 that strikes the chute GM31. The hammer member GM32 pivots about a pivot shaft GM321 extending in an upper-lower direction. The ground beans fed out in the substantially horizontal direction may collide with and adhere to an inner wall of the chute GM31. A user pivots the hammer member GM32 to strike the chute GM31, and applies an impact to the adhered ground beans to cause the ground beans to fall.

FIG. 3 is a diagram schematically showing a configuration of the second grinder 5B.

The second grinder 5B includes a second motor 52b, a motor base 502, a base portion 505a, and a particle size adjusting mechanism 503.

The second motor 52b is a drive source of the second grinder 5B, and is supported above the motor base 502. A pinion gear 52b' fixed to an output shaft of the second motor 52b and a gear 502a that meshes with the pinion gear are disposed above the motor base 502.

A gear 55b' that meshes with the gear 502a is disposed above the base portion 505a. A rotation shaft 54b is fixed to the gear 55b', and the rotation shaft 54b is rotatably supported by the base portion 505a. The rotation shaft 54b is rotated by a driving force of the second motor 52b transmitted to the gear 55b' via the gear 502a. A rotary blade 58b is provided at an end portion of the rotation shaft 54b, and a fixed blade 57b is provided above the rotary blade 58b. That is, the fixed blade 57b is disposed in a manner of facing the rotary blade 58b.

The particle size adjusting mechanism 503 includes an adjustment motor 503a, which is a drive source of the particle size adjusting mechanism 503, and a worm gear 692 that is rotated by a driving force of the adjustment motor 503a. A gear portion 691g of a worm wheel 691 meshes with the worm gear 692.

FIG. 3 shows a frame member 694. The frame member 694 is fixedly disposed in a casing (not shown), and a female screw portion is provided on an inner peripheral surface of the frame member 694. A male screw portion 693s provided on an outer peripheral surface of a holder portion 693 meshes with the female screw portion of the frame member 694. As described above, the fixed blade 57b is screwed to a connection portion of the worm wheel 691 via the holder portion 693. Therefore, when the gear portion 691g of the worm wheel 691 rotates, the fixed blade 57b moves up and down in an axial direction of the gear portion 691g. A coupling port 691j of the worm wheel 691 is connected in a manner of overlapping a lower end of a coupling duct 661, and the connection with the lower end of the coupling duct 661 is maintained even when the worm wheel 691 moves downward. The fixed blade 57b shown in FIG. 3 is positioned at an initial position and is in a state of being most distant from the rotary blade 58b.

The processing unit 11a shown in FIG. 2 controls a rotation amount of the adjustment motor 503a to adjust a gap between the rotary blade 58b and the fixed blade 57b. By adjusting this gap, the particle size of ground beans in the second grinder 5B can be adjusted.

The fixed blade 57b that moves up and down has a detection position that is separated from the rotary blade 58b by a predetermined distance (for example, 0.7 mm). The detection position is a position closer to the rotary blade 58b than the initial position of the fixed blade 57b. The second grinder 5B is provided with a sensor 57c that detects the fixed blade 57b is at the detection position.

Next, a coffee bean grinding machine according to a second embodiment will be described in a case in which the coffee bean grinding machine shown in FIG. 1 is used as a coffee bean grinding machine according to a first embodiment. In the following description, components having the same names as those of the components described above are also denoted by the same reference signs as those used above. Differences from the coffee bean grinding machine shown in FIG. 1 will be described, and a repetitive description will be omitted. The coffee bean grinding machine GM according to the second embodiment includes the pulverizing device 5 having the same structure as the pulverizing device 5 of the coffee bean grinding machine GM according to the first embodiment, and in a description of the second embodiment, the first grinder 5A is referred as a top mill 5AM, and the second grinder 5B is referred to as a main mill 5BM. A motor that causes the top mill 5AM to rotate is referred to as a top mill motor (corresponding to a first motor), and a motor that causes the main mill 5BM to rotate is referred to as a main mill motor.

FIG. 4 shows perspective views of the coffee bean grinding machine according to the second embodiment. (A) of FIG. 4 is the perspective view of the coffee bean grinding machine GM in a state of holding a cup CP when viewed obliquely from the front left of the machine, that is, from the front right when viewed from an operator, and (B) of FIG. 4 is the perspective view of the coffee bean grinding machine GM from which the cup CP is removed when viewed obliquely from the front right of the machine, that is, from the front left when viewed from the operator.

FIG. 5 is a diagram showing a path for the coffee beans, a path for the waste such as chaff, and a path for the after-cleaning.

FIG. 5 shows the top mill 5AM, a top mill upper case 501 covering an upper portion of the top mill 5AM, a separation chamber forming portion 64, the coupling duct 661, a coupling dial 697, the worm wheel 691, the frame member 694 covering the main mill 5BM, the chute GM31, a pipe portion 63, an upper portion 61 of a recovery container 60B, an inner case 60Bi disposed in a lower portion 62 of the recovery container 60B, and a fan unit 60A. An outer case 60Bo disposed in the lower portion 62 of the recovery container 60B is not shown.

In FIG. 5, the path for the coffee beans is indicated by a one-dot chain line. That is, the roasted coffee beans become cracked beans by the top mill 5AM, the cracked beans pass through the separation chamber forming portion 64 and the coupling duct 661 and become the ground beans which are ground by the main mill 5BM, and the ground beans flow down from the chute GM31.

Further, in FIG. 5, the path for the waste such as chaff is indicated by a two-dot chain line. That is, the waste such as chaff that enters the separation chamber forming portion 64 together with the cracked beans is aspirated by rotation of a chaff fan in the fan unit 60A, passes through the separation chamber forming portion 64 and the pipe portion 63, and arrives the recovery container 60B. In the recovery container 60B, the waste such as chaff are deposited on a bottom of the lower portion 62 of the recovery container 60B (bottom surface of the outer case 60Bo (not shown)) due to own weight thereof. Air obtained by the separation of the waste becomes an upward air flow from inside the inner case 60Bi, passes through the fan unit 60A, and is exhausted to an outside of the coffee bean grinding machine GM. In this way, even if the fan unit 60A is aspirating the waste such as chaff while the top mill 5AM is rotating, if the set value is low (when an aspiration force is weak), the waste such as chaff may remain in inner regions of the pipe portion 63 and the separation chamber forming portion 64. Even if the set value is high, the waste such as chaff may adhere to inner peripheral walls of the pipe portion 63 and the separation chamber forming portion 64 and cannot be completely removed. Therefore, after the grinding process is ended, the inner regions of the pipe portion 63 and the separation chamber forming portion 64 (inner regions surrounded by thick solid lines in FIG. 5) are aspirated with a stronger aspiration force to recover the waste such as chaff remaining in the inner regions, and to remove the waste such as chaff adhering to the inner peripheral walls. The waste such as chaff remaining in the inner regions or adhering to the inner peripheral walls arrives the recovery container 60B as indicated by a thick solid line arrow and falls by own weight. By performing the after-cleaning every time the grinding process is ended, it is possible to prevent the waste such as chaff from accumulating on the inner peripheral walls.

FIG. 6 is a perspective view showing a state in which a main mill unit 5BMu is removed from a main body GMb of the coffee bean grinding machine GM.

The main mill unit 5BMu is fixed to the main body GMb by a fixing screw 701. That is, by removing the one fixing screw 701, the main mill unit 5BMu can be removed from the main body GMb.

The main mill unit 5BMu includes the coupling duct 661, the coupling dial 697, the worm wheel 691, and the chute GM31 described above. Further, the main mill unit 5BMu includes a fixed blade unit 710 and a rotary blade unit 720. The coupling duct 661 is merely placed on the worm wheel 691. The ground beans ground by the top mill 5AM are introduced from an upper end of the coupling duct 661.

FIG. 7 shows diagrams illustrating a configuration of the main mill unit 5BMu.

In an upper portion of FIG. 7, a perspective view is shown in which a direction of the main mill unit 5BMu shown in FIG. 6 is changed. In the main mill unit 5BMu shown in the upper portion of FIG. 7, the chute GM31 is positioned on a left back side, and the fixing screw 701 shown in FIG. 6 is shown on a right front side in FIG. 7. The coupling duct 661, the coupling dial 697, the worm wheel 691, the fixed blade unit 710, and the rotary blade unit 720 are illustrated. Further, an air suction port 661a provided in the coupling duct 661 and a coupling gear 697g provided in the coupling dial 697 are also shown.

The fixed blade unit 710 and the rotary blade unit 720 can be separated from each other. In a lower portion of FIG. 7, a state in which the rotary blade unit 720 is separated from the main mill unit 5BMu is shown. That is, the rotary blade unit 720 detached from the main mill unit 5BMu is shown in a lower right portion of FIG. 7. On the other hand, a state in which the rotary blade unit 720 is removed from the main mill unit 5BMu is shown in a lower left portion of FIG. 7. That is, the coupling duct 661, the coupling dial 697, the worm wheel 691, and the fixed blade unit 710 are shown.

FIG. 8 is an exploded perspective view showing a state in which the rotary blade unit 720 is removed from the main mill unit 5BMu shown in the lower left portion in FIG. 7. That is, FIG. 8 is an exploded perspective view showing the coupling duct 661, the coupling dial 697, the worm wheel 691, and the fixed blade unit 710.

In FIG. 8, the coupling duct 661, the coupling dial 697, and the worm wheel 691 are shown in this order from the top.

Further, in FIG. 8, the fixed blade unit 710 is shown in an exploded manner. The fixed blade unit 710 includes a fixed blade case body 711, a base member 712, an intermediate member 713, and the fixed blade 57b. The fixed blade case body 711 corresponds to the frame member 694 shown in FIG. 3. The fixed blade case body 711 accommodates the base member 712, the intermediate member 713, and the fixed blade 57b inside, and a female screw portion 711s is provided on an inner peripheral surface thereof. Further, the chute GM31 is attached to the fixed blade case body 711, and an inlet of the chute GM31 is connected to an outlet 7111 of the ground beans provided in the fixed blade case body 711.

The base member 712 is provided with three accommodating holes 7121 at equal intervals in a circumferential direction. Ensats 715 are accommodated in these three accommodating holes 7121 in a manner of not being rotatable around an axis. A bolt through hole 7124 (see (A) of FIG. 9) is provided below the accommodating hole 7121, and the bolt through hole 7124 is connected to the accommodating hole 7121. The base member 712 is also provided with screw holes 7122 at positions shifted from the accommodating holes 7121 in a circumferential direction. Three screw holes 7122 are also provided at equal intervals in the circumferential direction. FIG. 8 also shows three interval adjustment member coupling bolts 690. Each of the three interval adjustment member coupling bolts 690 penetrates coupling holes 6971 of the coupling dial 697 and coupling holes 6911 of the worm wheel 691, and is screwed into the screw holes 7122 provided in the base member 712. In this way, the coupling dial 697 and the worm wheel 691 are integrally coupled to the fixed blade unit 710.

The intermediate member 713 is provided with three enlarged diameter portions 7131 at equal intervals in a circumferential direction. The intermediate member 713 is also provided with spring accommodating recesses 7132 at positions shifted from the enlarged diameter portions 7131 in the circumferential direction. Three spring accommodating recesses 7132 are also provided at equal intervals in the circumferential direction. A lower end side of compression coil springs 716 is accommodated in each of the three spring accommodating recesses 7132. An operation of the compression coil spring 716 will be described later.

The fixed blade 57b is provided with three mounting holes 579 at equal intervals in a circumferential direction.

The fixed blade 57b, the intermediate member 713, and the base member 712 are disposed such that the mounting holes 579, the enlarged diameter portions 7131, the bolt through holes 7124 (see (A) of FIG. 9), and the accommodating holes 7121 coincide with each other, coupling bolts 714 are inserted from a fixed blade 57b side (lower side), a head portion 7141 of the coupling bolt 714 abuts against the fixed blade 57b, and a tip end portion 7142 is screwed to the ensat 715 accommodated in the accommodating hole 7121. In this way, the fixed blade 57b, the intermediate member 713, and the base member 712 are coupled to each other, and the intermediate member 713 is sandwiched between the fixed blade 57b and the base member 712.

A male screw portion 712s is provided on an intermediate member 713 side (lower side) of the outermost peripheral surface of the base member 712. A male screw portion 713s is also provided on the outermost peripheral surface of the intermediate member 713. In a state in which the fixed blade 57b, the intermediate member 713, and the base member 712 are coupled by the coupling bolts 714, a continuous male screw portion is formed by the male screw portion 712s of the base member 712 and the male screw portion 713s of the intermediate member 713. The continuous male screw portion corresponds to the male screw portion 693s shown in FIG. 3, and is hereinafter referred to as a coupling male screw portion 710s. The coupling male screw portions 710s meshes with the female screw portion 711s provided on the inner peripheral surface of the fixed blade case body 711. The female screw portion 711s of the fixed blade case body 711 corresponds to the female screw portion of the frame member 694 shown in FIG. 3. In the following description, a coupled body in which the fixed blade 57b, the intermediate member 713, and the base member 712 are coupled by the coupling bolts 714 are referred to as a fixed blade coupled body 717.

A manual setting disc dial 695 (see FIG. 12) is placed on the coupling dial 697. When the manual setting disc dial 695 is placed on the coupling dial 697, the coupling gear 697g and a gear of the manual setting disc dial 695 mesh with each other. When the manual setting disc dial 695 is rotated, the fixed blade coupled body 717 is rotated via the coupling gear 697g. Since the main mill unit 5BMu is fixed to the main body GMb by the fixing screw 701, the fixed blade case body 711 is also fixed to the main body GMb, the coupling male screw portions 710s mesh with the female screw portion 711s of the fixed blade case body 711, and thus the fixed blade coupled body 717 moves up and down inside the fixed blade case body 711 in accordance with the rotational operation of the manual setting disc dial 695. Accordingly, the fixed blade 57b comes into contact with and separates from the rotary blade 58b, and a main mill interval is adjusted.

(A) of FIG. 9 shows cross-sectional perspective views of the base member 712.

At a right end of the base member 712 shown in (A) of FIG. 9, a cross section of the accommodating hole 7121 and the bolt through hole 7124 connected to the accommodating hole 7121 are shown. On the other hand, a spring insertion recess 7123 is shown at a left end on an opposite side. Three spring insertion recesses 7123 of the base member 712 are provided at equal intervals in the circumferential direction on the intermediate member 713 side (lower side), and one of the spring insertion recesses 7123 is shown in (A) of FIG. 9. The spring insertion recess 7123 corresponds to the spring accommodating recess 7132 of the intermediate member 713. The spring insertion recess 7123 is not a through hole but a recess including a top surface 7123a.

(B) of FIG. 9 is a cross-sectional perspective view of the intermediate member 713.

Inclined surfaces 7131a constituting the enlarged diameter portion 7131 is shown at a right end of the intermediate member 713 shown in (B) of FIG. 9. The enlarged diameter portion 7131 is also shown on an inner side of a center in the plane, and the inclined surfaces 7131a constituting the enlarged diameter portion 7131 is also shown.

(B) of FIG. 9 shows the two compression coil springs 716. The compression coil spring 716 shown on the inner side of the center in the plane is accommodated in the spring accommodating recess 7132, and only an upper portion thereof is visible. On the other hand, a state is shown in which a lower portion of the compression coil spring 716 shown on the left side is accommodated in the spring accommodating recess 7132. The spring accommodating recess 7132 is also not a through hole, and is a recess including a bottom surface 7132a. The compression coil spring 716 is inserted into the spring accommodating recess 7132 from a base member 712 side (upper side), an end portion of the compression coil spring 716 on the fixed blade 57b side (lower side) is supported by the bottom surface 7132a, and the lower portion of the compression coil spring 716 is accommodated in the spring accommodating recess 7132. The upper portion of the compression coil spring 716 in which the lower portion is accommodated in the spring accommodating recess 7132 protrudes from the intermediate member 713. A part or all of a protruding portion of the compression coil spring 716 is inserted into the spring insertion recess 7123 of the base member 712 illustrated in (A) of FIG. 9.

FIG. 10 shows cross-sectional views schematically showing the fixed blade coupled body 717 and illustrates an action of the compression coil spring 716.

On a right side of the fixed blade coupled body 717 shown in FIG. 10, there is shown the coupling bolt 714 which is inserted from the mounting hole 579 of the fixed blade 57b, and screwed into the ensat 715 accommodated in the accommodating hole 7121 of the base member 712 without coming into contact with the intermediate member 713 through a space expanded by the enlarged diameter portion 7131. The head portion 7141 of the coupling bolt 714 abuts against the fixed blade 57b, and the fixed blade 57b is fixed to the base member 712 by the coupling bolt 714.

The intermediate member 713 is movable in the upper-lower direction between the base member 712 and the fixed blade 57b. That is, the intermediate member 713 is movable in a separating direction with respect to the movable blade 58b. Hereinafter, the upper-lower direction may be referred to as a contact and separation direction.

In addition, on a left side of the fixed blade coupled body 717 shown in FIG. 10, the compression coil spring 716 in which the lower portion is accommodated in the spring accommodating recess 7132 is shown.

(A) of FIG. 10 shows the fixed blade coupled body 717 in a state before the coupling male screw portions 710s mesh with the female screw portion 711s of the fixed blade case body 711 shown in FIG. 8. That is, a cross-sectional view of the fixed blade coupled body 717 before being accommodated in the fixed blade case body 711 is shown.

In the fixed blade coupled body 717 shown in (A) of FIG. 10, the base member 712 and the intermediate member 713 are separated from each other, and a gap is left between an upper end of the compression coil spring 716 and the top surface 7123a of the spring insertion recess 7123. Therefore, the compression coil spring 716 is in a fully extended state, and no biasing force is generated.

(B) of FIG. 10 shows the fixed blade coupled body 717 in a state in which the fixed blade coupled body 717 is screwed into the fixed blade case body 711 shown in FIG. 8 from above. That is, the coupling male screw portions 710s mesh with the female screw portion 711s of the fixed blade case body 711, and a downward force (see a thick arrow in the drawing) is applied to the fixed blade coupled body 717 when the fixed blade coupled body 717 is screwed from above.

In the fixed blade coupled body 717 shown in (B) of FIG. 10, the base member 712 abuts against the intermediate member 713, and the intermediate member 713 and the fixed blade 57b are separated from each other. The upper end of the compression coil spring 716 abuts against the top surface 7123a (see (A) of FIG. 10) of the spring insertion recess 7123, and the compression coil spring 716 is in the most contracted state and generates the maximum biasing force. That is, as indicated by a thick hollow arrow in (B) of FIG. 10, the compression coil spring 716 biases the intermediate member 713 downward and biases the base member 712 upward.

(C) of FIG. 10 shows the fixed blade coupled body 717 in a state in which the adjustment of the main mill interval is completed. The fixed blade coupled body 717 shown in (C) of FIG. 10 is in a state in which the coffee beans are actually ground.

In the fixed blade coupled body 717 shown in (C) of FIG. 10, a slight gap is formed between the base member 712 and the intermediate member 713, and the intermediate member 713 and the fixed blade 57b are also separated from each other. The upper end of the compression coil spring 716 abuts against the top surface 7123a (see (A) of FIG. 10) of the spring insertion recess 7123, and the compression coil spring 716 is in a contracted state and generates a certain degree of biasing force. A gap corresponding to a backlash is inevitably present between the coupling male screw portion 710s and the female screw portion 711s shown in FIG. 8. This gap may affect fine adjustment of the main mill interval. As indicated by a fine hollow arrow in (C) of FIG. 10, the compression coil spring 716 biases the intermediate member 713 downward and biases the base member 712 upward so as to eliminate the gap corresponding to the backlash. Due to this biasing force, a position of the intermediate member 713 in the contact and separation direction (upper-lower direction) is regulated, and a position of the base member 712 in the contact and separation direction is also regulated. Further, since the position of the base member 712 is regulated, a position of the fixed blade 57b fixed to the base member 712 is also regulated.

As described above, the gap corresponding to the backlash formed between the coupling male screw portion 710s and the female screw portion 711s is reduced by the biasing force of the compression coil spring 716. Since the compression coil springs 716 are provided at equal intervals in the circumferential direction, the positions of the intermediate member 713 and the base member 712 in the contact and separation direction are uniformly regulated in the circumferential direction, and a position of the fixed blade 57b in the contact and separation direction is also uniformly regulated in the circumferential direction. As a result, the fine adjustment of the main mill interval is correctly reflected, and the particle size of the ground beans can be accurately managed.

(A) of FIG. 11 is a view in which the state in which the rotary blade unit 720 is detached from the main mill unit 5BMu shown in the lower left portion of FIG. 7 is inverted upside down. That is, (A) of FIG. 11 is a view in which the coupling duct 661 is pressed by a hand, and the coupling duct 661, the coupling dial 697, the worm wheel 691, and the fixed blade unit 710 are turned upside down.

The chute GM31 is also attached to the fixed blade case body 711 of the fixed blade unit 710 in (A) of FIG. 11 in the same manner as in FIG. 8.

In (A) of FIG. 11, a blade surface of the fixed blade 57b is visible. The head portion 7141 of the coupling bolt 714 is visible on the blade surface.

A combining female screw portion 7112 is provided on an inner peripheral edge portion of the fixed blade case body 711 on a rotary blade unit 720 side.

(B) of FIG. 11 is a perspective view of the rotary blade unit 720 detached from the main mill unit 5BMu, and is the same view as the view shown in the lower right portion of FIG. 7.

The rotary blade unit 720 includes a rotary blade case body 721 and a main body attachment frame 722. A combining male screw portion 7211 is provided on an outer peripheral edge portion of the rotary blade case body 721 on a fixed blade unit 710 side. When one of the fixed blade case body 711 and the rotary blade case body 721 is manually rotated in a predetermined direction in a state in which the inner peripheral edge portion of the fixed blade case body 711 on the rotary blade unit 720 side is externally fitted to the outer peripheral edge portion of the rotary blade case body 721 on the fixed blade unit 710 side, the combining female screw portion 7112 and the combining male screw portion 7211 are screwed together, and the fixed blade case body 711 and the rotary blade case body 721 are integrated. On the other hand, when one of the fixed blade case body 711 and the rotary blade case body 721 is manually turned in a direction opposite to the predetermined direction in a state in which the fixed blade case body 711 and the rotary blade case body 721 are integrated with each other, the fixed blade case body 711 and the rotary blade case body 721 are separated from each other. A separation direction of the fixed blade case body 711 and the rotary blade case body 721 coincides with a direction in which the main mill interval increases. Without using a tool, the fixed blade case body 711 and the rotary blade case body 721 can be integrated or separated, and maintainability is excellent.

A rotary base 59 is attached to the rotary blade case body 721, and the rotary blade 58b is fixed to the rotary base 59 by bolts 594. A drive gear 550 is accommodated in the rotary blade case body 721. The same rotation shaft (not shown in (B) of FIG. 11) as the rotation shaft 54b described with reference to FIG. 3 penetrates through a center of the rotary blade 58b, and the rotary blade 58b is fixed to the rotation shaft by a bolt 595 and a rotation stopper washer 596. Therefore, the rotary blade 58b is also rotated by rotation of the rotation shaft (not shown) around an axis. The separation direction of the fixed blade case body 711 and the rotary blade case body 721 also coincides with an extending direction of the rotation shaft. In (B) of FIG. 11, six blades 593 are shown. In a state in which the fixed blade case body 711 and the rotary blade case body 721 are integrated, the six blades 593 rotate in the fixed blade case body 711 and move the ground beans in the circumferential direction. The ground beans are discharged from the outlet 7111 of the ground beans shown in FIG. 9 to an outside of the machine through the chute GM.

The rotation shaft (not shown) is rotated by the rotation of the drive gear 550, a part of which is seen from a gear meshing window 7212 of the rotary blade case body 721. The drive gear 550 corresponds to the gear 55b' shown in FIG. 3.

Further, in (B) of FIG. 11, the blade surface of the rotary blade 58b is seen. In a state in which the fixed blade case body 711 and the rotary blade case body 721 are separated from each other, it is possible to touch a blade edge or the blade surface of the fixed blade 57b attached to the fixed blade case body 711, and it is possible to perform maintenance of the fixed blade 57b. When the coupling bolt 714 is loosened and pulled out, the fixed blade 57b can also be replaced. In the state in which the fixed blade case body 711 and the rotary blade case body 721 are separated from each other, it is also possible to touch the blade edge or the blade surface of the rotary blade 58b attached to the rotary blade case body 721, and it is also possible to perform the maintenance of the rotary blade 58b, and thus it is also possible to replace the rotary blade 58b.

In the above description, only the main mill unit 5BMu on which the fixed blade and the rotary blade having a pattern of one type of blade are mounted is illustrated, but a plurality of main mill units on each of which the fixed blade and the rotary blade having patterns of different blades are mounted are prepared, and the entire main mill unit 5BMu is replaced instead of replacing the fixed blade 57b and the rotary blade 58b themselves.

FIG. 12 shows perspective views showing the main mill unit 5BMu, the main mill motor, a transmission mechanism that transmits a driving force of the main mill motor, the manual setting disc dial 695, a spring 699, a sensor substrate GM316, and a mechanical switch unit 600 extracted from the coffee bean grinding machine GM in which the main mill unit 5BMu is mounted on the main body GMb shown in FIG. 6. In the perspective view of (A) of FIG. 12, the chute GM31 is positioned on a right front side, and (A) of FIG. 12 is a perspective view when viewed from slightly above.

The spring 699 shown in (A) of FIG. 12 presses the manual setting disc dial 695 against the coupling dial 697. When the manual setting disc dial 695 is placed on the coupling dial 697, the gear (not shown) of the manual setting disc dial 695 and the coupling gear 697g (see FIG. 8 and the like) mesh with each other, and the rotational operation of the manual setting disc dial 695 is transmitted to the coupling dial 697, but when the manual setting disc dial 695 floats, the rotational operation of the manual setting disc dial 695 is not transmitted to the coupling dial 697, and thus the manual setting disc dial 695 is pressed against the coupling dial 697 by the spring 699. The manual setting disc dial 695 and the spring 699 are disposed in the main body GMb.

The sensor substrate GM316 shown in (A) of FIG. 12 is a substrate on which a sensor that detects the chute GM31 is mounted. The chute GM31 can be opened and closed by pivoting. The chute GM31 shown in (A) of FIG. 12 is in a closed state, and when the chute GM31 is open, a signal indicating that the chute GM31 is not detected is output from the sensor substrate GM316. The sensor substrate GM316 is also disposed on the main body GMb.

Further, (A) of FIG. 12 shows a transmission belt 552 and a transmission gear 553 as a transmission mechanism that transmits a driving force of a main mill motor 551. The transmission belt 552 is wound around a rotation shaft 5511 of the main mill motor 551 and the transmission gear 553, and the driving force of the main mill motor 551 is transmitted to the transmission gear 553 by the transmission belt 552. The main mill motor 551, the transmission belt 552, and the transmission gear 553 are disposed in the main body GMb.

(B) of FIG. 12 is a perspective view in which a direction is changed from that of (A) of FIG. 12, and is a perspective view when the chute GM31 is positioned on the left back side and is viewed from slightly below.

As shown in (B) of FIG. 12, the main body attachment frame 722 includes a cover portion 7221 that covers a bottom portion of the rotary blade case body 721, and an arm portion 7222 that extends from the cover portion 7221 toward the main mill motor 551. The bottom portion of the rotary blade case body 721 is covered by the cover portion 7221 of the main body attachment frame 722, and the rotary blade case body 721 and the main body attachment frame 722 are coupled to each other by a coupling bolt 723.

A frame member (not shown) into which the fixed blade case body 711 is fitted is disposed in the main body GMb. (B) of FIG. 12 also shows the mechanical switch unit 600. The mechanical switch unit 600 detects movement of teeth constituting the gear portion provided on an outer periphery of the worm wheel 691.

In a case in which the main mill unit 5BMu is attached to the main body GMb, when the main mill unit 5BMu is placed from below and the fixed blade case body 711 is fitted into the frame member (not shown), a tip end portion of the arm portion 7222 of the main body attachment frame 722 coincides with an attachment hole provided in the main body GMb. Thereafter, the fixing screw 701 shown in FIGS. 6 and 7 is inserted into the tip end portion thereof, and the fixing screw 701 is tightened. Although the main mill unit 5BMu is screwed to the main body GMb only by the fixing screw 701, the frame member (not shown) is in contact with the fixed blade case body 711 in a range of ⅔ or more of a circumference excluding an attachment portion of the chute GM31 and the like, and a fitting structure of the fixed blade case body 711 with the frame member is strong.

When the main mill unit 5BMu is mounted on the main body GMb, the drive gear 550 on a unit side meshes with the transmission gear 553 on a main body side. Accordingly, the driving force generated by the main mill motor 551 is transmitted to the drive gear 550 via the transmission belt 552 and the transmission gear 553, and the drive gear 550 rotates, and thus the same rotation shaft as the rotation shaft 54b shown in FIG. 3 rotates, and the rotary blade 58b fixed to the rotation shaft rotates. Therefore, the drive gear 550 and the same rotation shaft as the rotation shaft 54b shown in FIG. 3 serve as power transmission portions mounted on the main mill unit 5BMu.

As described above, in the coffee bean grinding machine GM according to the second embodiment, the main mill motor 551, the transmission belt 552, and the transmission gear 553 are mounted on the main body GMb, and the manual setting disc dial 695 and the spring 699 are also mounted on the main body GMb. Therefore, even when the main mill unit 5BMu is replaced, these members are used in common, and a cost of the main mill unit 5BMu is reduced. The main body GMb and the main mill unit 5BMu are separated by a meshing portion between the transmission gear 553 and the drive gear 550 and a meshing portion between the gear (not shown) of the manual setting disc dial 695 and the coupling gear 697g. Therefore, the main mill unit 5BMu can be reliably attached to the main body GMb only by engaging these gears with each other, and attachment work of the main mill unit 5BMu is also easy.

In the above description, there is described "a coffee machine including:
a main body [for example, the main body GMb];
a grinder unit [for example, the main mill unit 5BMu] configured to grind coffee beans between a first blade [for example, the fixed blade 57b] and a second blade [for example, the rotary blade 58b]; and
an interval adjustment mechanism [for example, the manual setting disc dial 695, the coupling dial 697, the worm wheel 691, the fixed blade case body 711, and the fixed blade unit 710] configured to adjust an interval [for example, the main mill interval] between the first blade and the second blade, in which
the grinder unit is detachable from the main body,
the interval adjustment mechanism includes an operation portion [for example, the manual setting disc dial 695] that adjusts the interval in accordance with an operation, and an interlocking portion [for example, the coupling dial 697, the worm wheel 691, and the fixed blade unit 710] that is interlocked with the operation portion in accordance with the operation of the operation portion,
the operation portion is provided in the main body, and
the interlocking portion is provided in the grinder unit."

In this coffee machine, if the plurality of the grinder units each including the first blade and the second blade which have different patterns are prepared, the blades can be replaced with blades having different patterns by replacing the grinder unit, and the unit replacement can be performed more easily than in the case in which the two blades such as the first blade and the second blade are replaced. Further, since the operation portion is provided in the main body, the operation portion is used in common even when the unit is replaced, and an increase in cost of the grinder unit is prevented.

Here, the first blade may be a fixed blade, and the second blade may be a rotary blade.

The interval adjustment mechanism may manually adjust the interval, and the operation portion may be, for example, a rotary dial.

The main body may include a drive source [for example, the main mill motor 551] configured to rotationally drive the second blade, and the grinder unit may include a power transmission portion [for example, the drive gear 550 and the same rotation shaft as the rotation shaft 54*b* shown in FIG. 3] coupled to the drive source and configured to transmit power of the drive source to the second blade when the grinder unit is attached to the main body.

The first blade and the second blade may be of a flat type or a conical type. Further, the first blade and the second blade may be disposed in the upper-lower direction or in a lateral direction.

The grinder unit may be fixed to the main body in a cantilever manner. For example, the grinder unit may be configured such that one of fixing portions to the main body is fastened by a fastening member and all or a part of the other fixing portions are fitted into the main body.

The grinder unit may include a chute from which the ground beans come out [for example, the chute GM31].

Further, there is also described "the coffee machine, in which
the grinder unit includes a base member [for example, the base member 712 of the fixed blade unit 710] positioned on a side opposite to the second blade when viewed from the first blade [for example, the fixed blade 57*b*], a screw portion [for example, the female screw portion 711*s* of the fixed blade case body 711] meshing with the base member, and a position regulating member [for example, the compression coil spring 716 and the intermediate member 713] disposed between the first blade and the base member,
the base member is movable in a contact and separation direction in which the base member comes into contact with and separates from the second blade by a meshing structure with the screw portion [for example, the meshing structure between the male screw portion 712*s* of the base member 712 and the female screw portion 711*s* of the fixed blade case body 711],
the position regulating member regulates a position of the base member in the contact and separation direction, and
the first blade is attached to the base member [for example, attached by the coupling bolt 714], and a position of the first blade is also regulated by regulating a position of the base member by the position regulating member."

In this way, rattling due to the backlash of the meshing structure is prevented, the position of the first blade is less likely to change, and the interval adjusted by the interval adjustment mechanism is more likely to be faithfully maintained.

The base member may be movable in an expanding and contracting direction of the interval by the meshing structure with the screw portion.

The biasing members may be disposed at equal intervals in a circumferential direction between the first blade and the base member.

There is also described "the coffee machine, in which
the position regulating member includes an elastic body that expands and contracts in the contact and separation direction, and an intermediate member that is movable between the first blade and the base member,
a position of the intermediate member in the contact and separation direction is regulated by sandwiching the elastic body between the first blade and the base member, and
the position of the base member in the contact and separation direction is regulated by sandwiching the elastic body between the first blade and the base member."

The elastic body may be a compression spring.

There is also described "the coffee machine, in which
the grinder unit includes a first case body [for example, the fixed blade case body 711] to which the first blade is attached and a second case body [for example, the rotary blade case body 721] to which the second blade is attached, and
the first case body and the second case body can be separated from each other from an integrated state without using a tool, and can be returned from the separated state to the integrated state without using a tool [for example, a screwing structure of the combining female screw portion 7112 of the fixed blade case body 711 and the combining male screw portion 7211 of the rotary blade case body 721]."

Since the tool is not necessary, the maintainability is improved.

The first case body and the second case body may be brought into the integrated state by engagement, may be brought into the integrated state by fitting, or may be brought into the integrated state by screwing.

The first blade may be accommodated in the first case body, or may be attached to an outer peripheral surface of the first case body. The second blade may be attached to an outer peripheral surface of the second case body, or may be accommodated in the second case body.

Further, at least a part [for example, the fixed blade unit 710] of the interval adjustment mechanism may be provided in the first case body [for example, the fixed blade case body 711].

There is also described "the coffee machine, in which
a blade edge of the first blade is touchable when the first blade is attached to the first case body and the first case body is separated from the second case body, and
a blade edge of the second blade is touchable when the second blade is attached to the second case body and the second case body is separated from the first case body."

According to this aspect, it is possible to easily perform maintenance of the blade edge.

When the first blade is attached to the first case body and the first case body is separated from the second case body, an entire blade surface of the first blade may be touchable, or the first blade may be detachable from the first case body.

When the second blade is attached to the second case body and the second case body is separated from the first case body, an entire blade surface of the second blade may be touchable, or the second blade may be detachable from the second case body.

There is also described "the coffee machine, in which
the first case body and the second case body are separable from each other in an extending direction of a rotation shaft [for example, the same rotation shaft as the rotation shaft 54*b* described with reference to FIG. 3] of the second blade."

The first case body and the second case body may be separable in a direction in which the interval [for example, the main mill interval] increases.

Further, in the above description, there is described "a coffee machine including:
- a main body [for example, the main body GMb];
- a grinder unit [for example, the main mill unit 5BMu] configured to grind coffee beans between a first blade [for example, the fixed blade 57b] and a second blade [for example, the rotary blade 58b];
- a rotation drive mechanism configured to rotationally drive the second blade; and
- an interval adjustment mechanism configured to adjust an interval between the first blade and the second blade, in which
- the rotation drive mechanism includes a drive source [for example, the main mill motor 551] configured to rotationally drive the second blade, a first power transmission portion [for example, the transmission belt 552 and the transmission gear 553] configured to transmit power of the drive source, and a second power transmission portion [for example, the drive gear 550 and the same rotation shaft as the rotation shaft 54b shown in FIG. 3] configured to transmit the power transmitted from the first power transmission portion to the second blade,
- the interval adjustment mechanism includes a gear portion [for example, the gear of the manual setting disc dial 695] and an interlocking portion [for example, the coupling dial 697, the worm wheel 691, and the fixed blade unit 710] that is interlocked with the gear portion,
- the main body includes the drive source, the first power transmission portion, and the gear portion, and the grinder unit is fitted into the main body,
- the grinder unit includes the second power transmission portion and the interlocking portion, and is detachable from the main body, and
- when the grinder unit is fitted into the main body, the second power transmission portion is coupled to the first power transmission portion, and the interlocking portion is coupled to the gear portion."

The configuration of the coffee bean grinding machine GM according to the second embodiment described above can be applied to the coffee bean grinding machine GM according to the first embodiment, and can also be applied to a beverage production device including an extraction device in addition to a pulverizing device.

The present invention is not limited to the embodiments and examples described above, and the contents thereof can be combined with each other without departing from the spirit of the present invention, and may be partially changed according to an object or the like. The individual terms described in the present specification are merely used for describing the present invention, and it is needless to say that the present invention is not limited to the strict meaning of the terms, and can include equivalents thereof. For example, expressions such as "device" and "portion" may be rephrased as "unit", "module", or the like.

REFERENCE SIGNS LIST

GM coffee bean grinding machine
GMb main body
57b fixed blade
58b rotary blade
5BMu main mill unit
551 main mill motor
552 transmission belt
553 transmission gear
550 drive gear
695 manual setting disc dial
697 coupling dial
691 worm wheel
710 fixed blade unit

The invention claimed is:

1. A coffee machine comprising:
a main body;
a grinder unit configured to grind coffee beans between a first blade and a second blade;
a rotation drive mechanism configured to rotationally drive the second blade; and
an interval adjustment mechanism configured to adjust an interval between the first blade and the second blade, wherein
the rotation drive mechanism includes a first power transmission portion and a second power transmission portion,
the first power transmission portion includes (a) a power source to rotationally drive the second blade and (b) a transmission gear, and transmits power of the power source to the second power transmission portion,
the second power transmission portion includes a drive gear to be coupled to the transmission gear of the first power transmission portion, and transmits the power transmitted from the first power transmission portion to the second blade,
the interval adjustment mechanism includes an interlocking portion and an operation transmission portion to transmit an operation of the interval adjusting,
the operation transmission portion has a gear,
the interlocking portion has a coupling gear to be coupled to the gear of the operation transmission portion,
the gear of the operation transmission portion rotates in response to the operation of interval adjusting,
the coupling gear is coupled to the gear of the operation transmission portion and rotates by rotation of the gear of the operation transmission portion,
the interval adjustment mechanism adjusts the interval by raising and lowering the first blade by rotating the coupling gear,
the main body includes the power source, the first power transmission portion, and the operation transmission portion, and the grinder unit is fitted into the main body,
the grinder unit includes the second power transmission portion and the interlocking portion, and is detachable from the main body in a manner so as to be replaceable to the main body, and
when the grinder unit is fitted into the main body, the drive gear of the second power transmission portion is directly coupled to the transmission gear of the first power transmission portion, and the coupling gear of the interlocking portion is directly coupled to the gear portion of the operation transmission portion.

2. The coffee machine according to claim 1, wherein
when the grinder unit is released from the main body, the coupling between the second power transmission portion and the first power transmission portion is released, and the coupling between the interlocking portion and the gear portion is also released.

3. The coffee machine according to claim 1, wherein
the grinder unit includes an outlet through which the ground beans ground between the first blade and the second blade flow down to an outside, and is fitted into the main body from below, and the outlet is positioned below a coupling position between the second power transmission portion and the first power transmission portion and below a coupling position between the interlocking portion and the gear portion.

4. The coffee machine according to claim 1, wherein the main body includes a frame member, and
the grinder unit includes a case body defining an outer shape, and is attached to the main body by a fitting structure between the case body and the frame member.

5. The coffee machine according to claim 4, wherein
the main body is provided with an attachment hole,
the grinder unit includes an arm portion extending in one direction below the case body, and
when the case body is fitted into the frame member, a tip end portion of the arm portion coincides with the attachment hole, and the arm portion is fixed to the main body by a fixing screw inserted into the attachment hole from the tip end portion.

* * * * *